INVENTOR.
ROBERT S. JAMIESON
BY
ATTORNEYS

United States Patent Office 3,398,352
Patented Aug. 20, 1968

3,398,352
APPARATUS AND METHOD FOR STARTING,
OPERATING AND STOPPING AN INVERTER
Robert S. Jamieson, San Juan Capistrano, Calif., assignor, by mesne assignments, to Lorain Products Corporation, Lorain, Ohio, a corporation of Ohio
Filed Jan. 20, 1964, Ser. No. 338,748
61 Claims. (Cl. 321—45)

ABSTRACT OF THE DISCLOSURE

The disclosure relates to method and apparatus for starting and stopping an inverter which is connected through a transformer to a load, particularly a resonant load. Starting is effected by initially operating the inverter at a frequency much higher than the normal free-running frequency thereof. Stopping is effected by disconnecting the load from the transformer, and thereafter discontinuing the gate signals to the controlled rectifiers in the inverter. The disclosure further relates to a method and apparatus for driving the gate of a controlled rectifier, by supplying to such gate a train of trigger signals each having a magnitude and duration sufficient to trigger the controlled rectifier, the frequency of the train of signals being in the kilocycle range and being many times the frequency of the current passed through the controlled rectifier to the load connected thereto.

This invention relates to a method and apparatus for starting operation of an inverter when the same is connected to certain types of loads, to a method and apparatus for driving the gates of the SCR's in the inverter, and to a method and apparatus for stopping operation of the inverter. The invention further relates to the entire circuit, including the inverter as one component thereof.

When an inverter is connected to certain types of loads, particularly resonant loads, a major problem exists relative to starting operation of the inverter. Until the steady-state condition is achieved, there is relatively little limiting impedance in the resonant load circuit, the result being that a tremendous surge current is developed during at least the first half-cycle of inverter operation. Such a problem might be attacked by employing resistors to limit the current during the initial phases of inverter operation, the resistors being sequentially switched out of circuit as the steady-state condition is approached or achieved. This, however, produces various disadvantages including excessive wear on contacts, difficulty in effecting remote starting, etc. The problem is especially severe relative to high-power units, for example, those delivering three or more kilovolt-amperes, where the use of resistors in the indicated manner does not offer a practical solution.

In view of the above, it is a primary object of the present invention to provide a method and apparatus for starting an inverter which is connected to a resonant load or the like, without connecting resistors or other impedance elements in the battery or load circuits.

The problem of driving the gates of the SCR's in an inverter, or in various other circuits, has also been difficult of solution. The problem is especially important in situations where the gates may not be directly connected to the driver circuitry, for example, in parallel SCR square-wave inverters incorporating clamping diodes and an inductor, the latter being for the purpose of permitting a reduction in the size of the commutating capacitor. Although it is possible to employ a square-wave transformer between the driver circuitry and the SCR gates, the transformer must be excessively large in order to pass the desired square wave, it being pointed out that in order to pass a square wave at 60 cycles the transformer should be able to pass a 6-cycle sinusoidal wave. In addition, such a transformer is not normally characterized by the sharp rise time required for firing SCR's in the absence of frequency jitter.

It is therefore another important object of the present invention to provide a method and apparatus for driving the gates of an inverter, and elsewhere, without the necessity of employing large and therefore expensive transformers or the like.

A further problem relative to inverters, particularly those delivering large amounts of power to the load, relates to stopping the operation thereof. It is conventional to stop operation of an inverter by merely opening the main circuit breaker or switch, but this results in severe disadvantages relative to creation of arcs. Such disadvantages are, particularly in extremely high-power units, so severe as to make remote stopping impractical, and to result in excessive erosion of contacts, etc.

In view of the above, it is a further object of the present invention to provide a method and apparatus for stopping operation of an inverter, particularly an inverter delivering large amounts of power to a load, without producing substantial arcing or other undesired effects.

These and other objects will become apparent from the following detailed description taken in connection with the accompanying drawings in which:

FIGURES 1A and 1B combine to form a single circuit diagram illustrating schematically one embodiment of the present invention. FIGURES 1A and 1B are correlated by means of the letters A–G, inclusive, which letters are spaced corresponding distances from each other in order to facilitate correlation of the figures when the same are disposed end to end;

The present circuit may be incorporated in the standby power system described in my co-pending application for a Continuously-Operating Standby Power-Supply and Battery-Charging Apparatus and Method, filed Jan. 14, 1964, Ser. No. 337,621. Such system is adapted to supply standby power to a conventional 60-cycle A.C. power line indicated at 10 in the upper-right portion of FIGURE 1B. It is emphasized, however, that the present invention is not limited to such standby power system, and that the line 10 may be replaced by any load whatsoever.

Figure 1A:
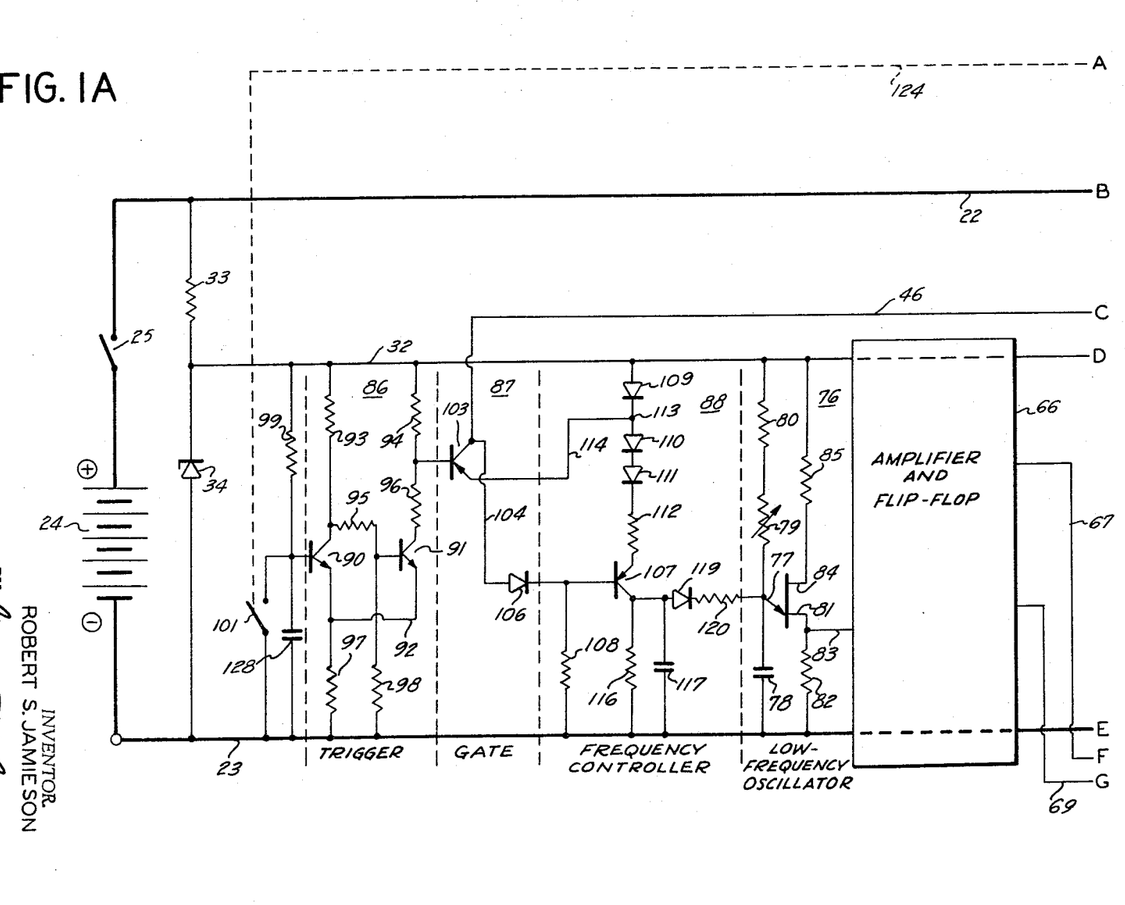
Figure 1B:
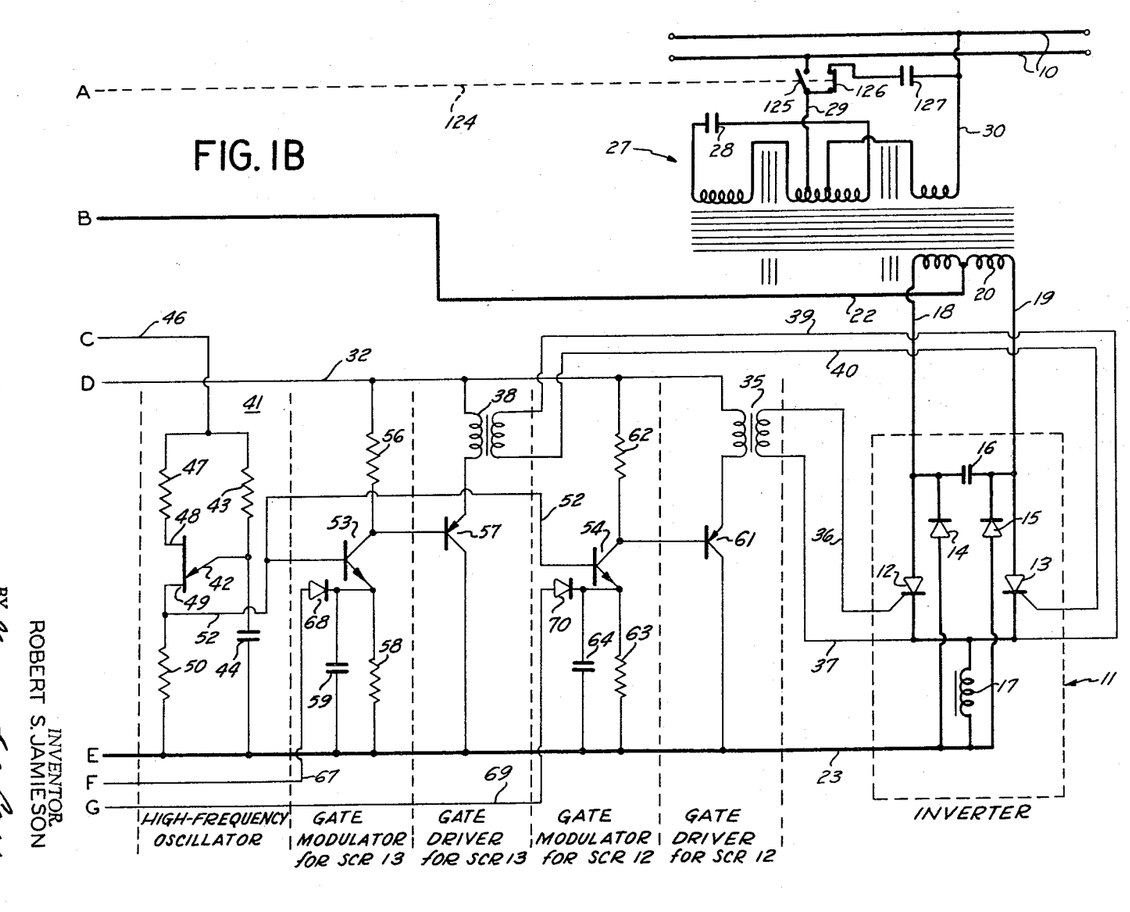

Referring first to the inverter 11, which is shown at the right side of FIGURE 1B, this is illustrated to comprise a conventional parallel square-wave SCR inverter. Such an inverter is described on page 152 et seq. of the General Electric SCR Manual, second edition, and incorporates two SCR's 12 and 13 which are reverse oriented relative to clamping, reactance or feedback diodes 14 and 15. The inverter also incorporates a commutating capacitor 16 and an inductor or choke 17, the later performing the important function of permitting commutation to occur with a capacitor 16 which is very much smaller than would be required in the absence of the choke.

The output leads 18 and 19 from inverter 11 extend from the anodes of the SCR's, and the cathodes of the diodes, to opposite end terminals of a transformer primary 20. The input to the inverter comprises leads 22 and 23 the former of which is connected to a center tap on transformer primary 20, and the latter of which is connected to choke 17 and to the anodes of diodes 14 and 15 (the cathodes of the SCR's being connected to the other side of the choke). Lead 22 extends to the positive terminal of a storage battery 24, and has interposed therein a switch 25 (normaly a circuit breaker responsive to overload conditions). Lead 23 is the negative or ground lead which extends from the inverter to the negative battery terminal.

As is described in some detail in my above-cited co-pending patent application, and assuming that the load is sufficiently reactive, the inverter 11 and battery 24 cooperate to effect flow of alternating current through the battery leads. Such battery current flows in a generaly clockwise direction through the lead 22, the SCR's 12 and 13 in inverter 11, and lead 23 back to the battery, and then in a generally counterclockwise direction through lead 23, the diodes 14 and 15 in inverter 11, and lead 22 back to the battery.

It is to be understood that the inverter 11 and battery 24 may also be reverse oriented in a manner known to the art. When such an arrangement is employed, lead 22 is connected to the negative battery terminal, lead 23 is connected to the positive battery terminal, and each of the elements 12–15 is reversed.

The transformer primary 20 is an inductive element forming part of a suitable coupling means for connecting the inverter to a load, whether such load is the above-indicated A.C. power line 10 or anything else. It is pointed out, however, that when the connection between the coupling means and line 10 (or other load) is broken, the coupling means itself forms the only load on the inverter 11. This is important relative to the method and apparatus for stopping inverter operation.

Stated more definitely, the indicated coupling means comprises a resonant circuit, preferably including a ferroresonant transformer 27 or any equivalent thereof. The indicated ferroresonant transformer is a harmonic-suppressing regulating transformer of the general type referred to on page 165 of the General Electric SCR Manual, second edition. Such transformer includes a capacitor 28 connected between end terminals of two of the secondary windings. Such capacitor forms part of a resonant or tank circuit in the output portion of the transformer, such resonant circuit being preferably tuned to approximately 80 or 90 cycles when the inverter 11 is adapted to generate a 60-cycle wave. The output of the ferroresonant transformer 27 is through leads 29 and 30 which are connected, respectively, to opposite sides of line 10 or any other load.

In addition to the indicated positive power lead 22, the indicated circuit may include what may be termed a positive control lead 32 which is at a voltage substantially lower than that of the power lead 22. Thus, negative lead 23 is employed in both the power and control circuits, whereas positive leads 22 and 32 are utilized in the power and control circuits, respectively. The positive control lead 32 is connected to a voltage-reducing and stabilizing circuit which is series connected between leads 22 and 23, comprising a resistor 33 and Zener diode 34. The Zener 34 which is connected between the leads 32 and 23 whereas resistor 33 is connected between leads 22 and 32, has a breakdown voltage lower than the battery voltage, for example 25 volts where the battery voltage is 52 volts.

METHOD AND APPARATUS FOR DRIVING THE GATES OF SCR's 12 AND 13

As previously indicated, the presence of inductor 17 makes it necessary, to prevent damage to or destruction of the SCR's 12 and 13 as is well known in the art, to utilize indirect coupling relative to the SCR gates. Thus, the gate of SCR 12 is supplied from the secondary of a pulse transformer 35 (via leads 36 and 37), whereas the gate of SCR 13 is supplied from the secondary of a second pulse transformer 38 (via leads 39 and 40). The pulse transformers 35 and 38 form components of gate driver circuits to be described subsequently.

Figure 6:
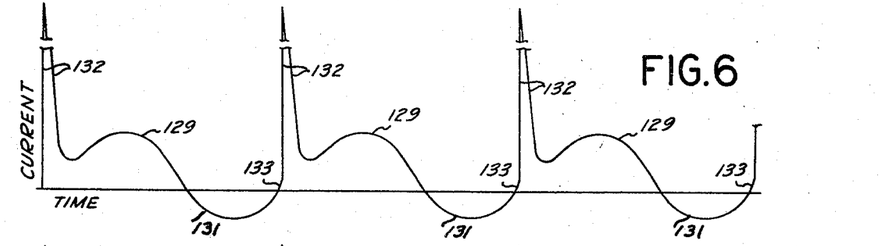
FIGURE 6 is a view corresponding to FIGURE 5 but illustrating the curent wave form after the load is disconnected from the resonant transformer, during stopping of inverter operation.

The pulse transformers 35 and 38 are small and inexpensive, and are to be distinguished from the large and expensive transformer which would be required to pass the square-wave gate-driving signal which is conventionally employed to trigger the gates of the SCR's in an inverter of the indicated type. Such a square-wave gate signal has previously been thought to be necessary in cases wher the load on the inverter is sufficiently reactive to effect flow through a diode during a portion of each half cycle, in order to re-trigger at the desired time the SCR which ceased conducting when diode current commenced to flow. Reference is made to FIGURE 6 for an illustration of a typical current wave where the load is reactive.

Figure 3:
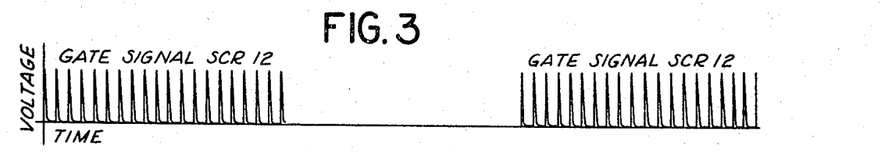
FIGURE 3 is a view illustrating the modulated pulse train which is delivered to the gate of one of the SCR's in the inverter.
Figure 4:
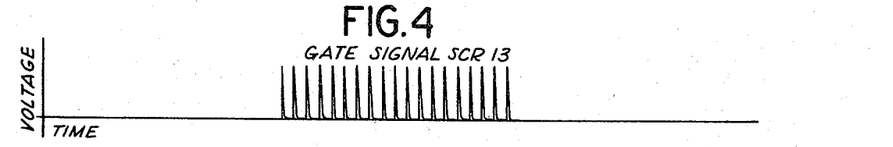
FIGURE 4 is a view corresponding to FIGURE 3 but showing the modulated pulse train delivered to the gate of the other SCR, such pulse train being 180 degrees out-of-phase relative to the first-mentioned pulse train.

The small pulse transformers 35 and 38 may be employed because they are not required to pass the usual square wave, but instead a high-frequency pulse train. The individual pulses in each pulse train are caused to have a voltage sufficiently high to trigger the SCR's 12 and 13, each pulse also being sufficiently long to effect such triggering. Because the minimum pulse length required for firing conventional presently existing SCR's is three microseconds, each of the pulses transmitted through transformers 35 and 38 is caused to have a duration longer than three microseconds. FIGURES 3 and 4 illustrate, in greatly expanded form in order that typical shapes of the individual pulses may be observed, the pulse trains transmitted to SCR's 12 and 13, respectively. As is clearly illustrated, the individual voltage pulses (and, therefore, the corresponding currents) are characterized by very short rise times.

It will thus be understood that, in accordance with a first aspect of the method and apparatus for driving the SCR gates, such gates are driven not by a single pulse or square wave but instead by a high-frequency pulse train. This general concept may be employed not only in the present inverter circuit but in other circuits wherein SCR's are employed. The frequency of the pulse train must be sufficiently low that each pulse will effect firing of an SCR 12 or 13, it being understood that at the lower frequencies each pulse has a duration much longer than at higher frequencies. On the other hand, the frequency should not be excessively low because this would create an unduly long time interval between successive pulses. If the interval between pulses is excessive, there may be no pulse present at an SCR gate when it is desired to fire the SCR, so that distortion and other adverse effects would occur in the inverter output. It has been found that a desirable frequency range is between 15 and 30 kilocycles, an optimum frequency being about 20 kilocycles.

The described pulse train may be generated in various ways, for example by the illustrated high-frequency oscillator which is a unijunction transistor relaxation oscillator, and has been given the reference numeral 41. In the indicated oscillator, the emitter 42 of the unijunction transistor is connected to the junction between a resistor 43 and a capacitor 44, the latter being connected to negative lead 23 whereas the former is connected to a lead 46 adapted to deliver B+ voltage to the oscillator at desired times as will be specified hereinafter. Lead 46 is also connected through a resistor 47 to base-two 48, whereas base-one 49 of the transistor is connected through a resistor 50 to ground lead 23.

The voltage delivered to capacitor 44 through B+ lead 46 and the resistor 43, builds up rapidly to the value required to fire the unijunction and cause discharge of capacitor 44 through emitter 42, base-one 49 and resistor 50. Each such firing causes a voltage pulse to be delivered through an output lead 52 to the bases of two NPN transistors 53 and 54. Transistor 53 forms part of a gate modulator circuit for the gate driver circuit including pulse transformer 38. Correspondingly, transistor 54 forms part of the gate modulator circuit for the gate driver incorporating pulse transformer 35.

The capacitor 44 in unijunction oscillator 41 has a low value, for example 0.01 microfarad, which (when the magnitude of resistor 43 is appropriately selected) means that the described charging and discharging of such capacitor will be effected at a high frequency in the indicated range. It is to be understood that it would be possible, in some SCR circuits, to connect the high-frequency oscillator directly to the gates of the SCR's, in the absence of any transformers and/or any modulation.

In accordance with a second aspect of the method and apparatus for driving SCR gates, particularly in the present inverter circuit, the high-frequency pulse train generated by oscillator 41 is modulated in the manner of a square wave, that is to say that the envelope of the pulse train is a square wave. This may be accomplished, as will be described below, by alternately cutting off the transistors 53 and 54. Such cutting off is effected by delivering a disabling signal first to one transistor and then to the other.

The collector of the transistor 53, in the gate modulator for SCR 13, is connected through a resistor 56 to positive control lead 32. Such collector is also connected to the base of a transistor 57 which forms parts of the gate driver circuit for SCR 13. The emitter of transistor 53 is connected to negative lead 23 through the parallel combination of a resistor 58 and capacitor 59, the latter having a magnitude selected to bypass the frequency of the oscillator 51 and thereby prevent emitter degeneration.

The emitter of transistor 57, in the gate driver circuit for SCR 13, is connected to one terminal of the primary of pulse transformer 38, the other terminal of such primary being connected to positive control lead 32. The collector of transistor 57 is connected to the ground lead 23. Thus, it will be understood that the transistor 57, which is a suitable PNP transistor, is connected in emitter-follower relationship relative to transistor 53, and therefore serves to lower the output impedance of such transistor 53, and to produce current (power) gain.

Figure 2:
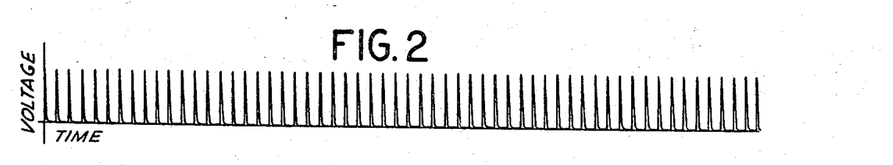
FIGURE 2 is a diagram showing the voltage pulse train generated by the high-frequency oscillator.

Assuming that there is no modulation (disabling) voltage applied to transistor 53, such transistor is in condition to pass and amplify the positive pulse train delivered thereto through lead 52 from the high-frequency oscillator 41. The amplified pulse train is fed to the emitter-follower stage including transistor 57, and appears at the primary of pulse transformer 38. Thus, if there were no modulation, the pulse train would be delivered continuously through leads 39 and 40 to the gate of SCR 13. However, the pulse train is modulated in square-wave fashion, in such manner that portions of the high-frequency pulse train are delivered intermittently to SCR 13, in the desired 180 degree out-of-phase relationship relative to the pulse train portions delivered intermittently to SCR 12. Reference is made to FIGURES 2–4, which show (in expanded manner, as previously noted) the original pulse train, and the modulated pulse trains supplied to the SCR gates.

The gate modulator and the gate driver for SCR 12 are identical to those described relative to SCR 13. Thus, a PNP transistor 61 is connected to transistor 54 in emitter-follower relationship, the primary of the pulse transformer 35 for SCR 12 being connected in the emitter circuit of such transistor 61. Resistor 62 corresponds to resistor 56, resistor 63 to resistor 58, and capacitor 64 to capacitor 59.

The previously-indicated disabling or modulating signals, which effect modulation of the high-frequency pulse train, are transmitted to transistors 53 and 54 from a suitable amplifier and flip-flop circuit which is represented schematically at 66. An output lead 67 from the flip-flop is connected through a blocking diode 68 to the emitter of transistor 53. Correspondingly, a second output lead 69 from the flip-flop is connected through a blocking diode 70 to the emitter of transistor 54. The flip-flop 66 delivers, first to lead 67 and then to lead 69, a positive signal sufficiently high to cut off the associated gate modulator transistor. For example, the disabling signal from the flip-flop may have a magnitude of approximately 15 volts, whereas the magnitude of each pulse from the high-frequency oscillator 41 may be on the order of 4 or 5 volts.

Proceeding next to a description of the means for driving the amplifier and flip-flop 66 at the frequency desired for modulating the high-frequency signal from oscillator 41, this comprises a low-frequency oscillator 76 which may be a unijunction transistor relaxation oscillator of the type described above relative to high-frequency oscillator 41. Thus, oscillator 76 includes a unijunction transistor the emitter 77 of which is connected through a capacitor 78 to negative lead 23. Emitter 77 is also connected through a variable resistor 79 and fixed resistor 80 to the positive control lead 32. Base-one of the transistor, numbered 81, is connected through a resistor 82 to the negative lead, being also connected through an output lead 83 to the input of the amplifier and flip-flop 66. Base-two of the transistor, numbered 84, is connected through a resistor 85 to positive lead 32.

In the present illustration, wherein it is desired that the inverter 11 supply a 60-cycle output frequency, the low-frequency oscillator 76 may be set to oscillate at approximately 120 cycles, this being because the amplifier and flip-flop 66 cuts the frequency in half so that the positive signals supplied alternately through flip-flop output leads 67 and 69 (in 180 degree out-of-phase relationship) have a 60-cycle frequency. The exact free-running frequency of oscillator 76 is determined by adjusting the variable resistor 79 and thereby controlling the charge time of capacitor 78. Since it is desired that oscillator 76 operate at a much lower frequency than oscillator 41, the capacitor 78 has a much higher value, for example 0.33 microfarad.

For a description of a combined oscillator and flip-flop, corresponding generally to oscillator 76 and the amplifier and flip-flop 66, reference is made to pages 155–157 of the General Electric SCR Manual, second edition.

In summary, therefore, transistor 53 in the gate modulator circuit for SCR 13 is operative, during periods when no disabling signal is supplied through lead 67 from flip-flop 66, to transmit through transistor 57 and pulse transformer 38 to SCR 13 the high-frequency signal generated by oscillator 41. During this period when transistor 53 is in conduction, transistor 54 in the gate modulator for the SCR 12 is cut off due to the presence of a positive disabling signal transmitted thereto from the flip-flop via lead 69. Thus, during this half-cycle of inverter operation there is no signal transmitted through transistor 61 and pulse transformer 35 to the gate of SCR 12. It follows that SCR 13 is then supplied with trigger signal, whereas SCR 12 is not. As soon as the flip-flop 66 reverses, a positive disabling signal is supplied through lead 67 whereas none is transmitted through lead 69. Transistor 53 is therefore cut off to block passage of high-frequency signal to the gate of SCR 13. However, transistor 54 is then in condition to pass the high-frequency signal for transmission to the gate of SCR 12. The gates of the SCR's are therefore driven by the pulse trains of high-frequency pulses (for example at 20 kilocycles), modulated at a 60-cycle rate, in push-pull relationship, as shown in FIGURES 3 and 4.

It is, of course, to be understood that the indicated 60-cycle modulation frequency is only illustrative. The frequency of modulation may be varied greatly, as may the envelope of the modulated wave.

From the above it will be understood that the present method and apparatus involve determining the desired frequency of operation of an inverter or other circuit incorporating an SCR (or equivalent thyristor), and then repeatedly supplying bursts of triggering pulses to the gate of the SCR. Each burst corresponds to at least one "conduction period" of the SCR. The "conduction period" is that time interval during which conduction of current through the anode and cathode of the SCR is desired and is possible.

The burst-repetition rate is at least equal to the desired frequency of operation of the SCR (that is to say, of the main wave through the SCR anode and cathode). The frequency of the triggering pulses forming each burst is many times higher than the burst-repetition rate, and many times higher than the frequency of the main current wave. Stated otherwise, the ratio of triggering-pulse frequency to the burst-repetition rate, and to main-wave frequency, is very high. Thus, where the main-wave frequency is in the conventional power range (such as 60 cycles), the triggering-pulse frequency in each burst is in the kilocycle range and should be many kilocycles.

A multiplicity of the above-described triggering pulses are supplied to the gate of the SCR during each conduction period thereof. Because a multiplicity of the high-frequency triggering pulses are provided in each conduction period, and in substantially equally-spaced relationship relative to each other (from a time standpoint, as shown in FIGURES 2–4), conduction in each SCR commences very early in the conduction period thereof. The triggering-pulse train is characterized by good resolution, and the output wave through the SCR has minimum distortion. It is inherent in the present disclosure that the present means and method are particularly suitable for those applications wherein the load is reactive and has an unknown or varying power factor.

METHOD AND APPARATUS FOR STARTING OPERATION OF INVERTER 11 WITHOUT CREATING HIGH SURGE CORRENTS IN THE RESONANT LOAD 27

There will next be described the method and circuitry for effecting starting of the inverter 11, in the absence of excessive current surges through the inductive or resonant element 27. Such current surges are, particularly in high-power equipment, sufficiently great (in the absence of the present invention) to result in severe adverse effects such as destruction of the SCR's 12 and 13. It is to be understood that the circuitry next to be described also cooperates relative to other aspects of the invention, such as driving of the SCR gates and stopping inverter operation. Conversely, the previously-described circuitry may be employed relative to the inverter starting and stopping aspects of the invention.

Referring to the left portion of FIGURE 1A, a trigger circuit 86 is shown as connected to a gate circuit 87. The gate 87 is connected both to the high-frequency oscillator 41, via B+ lead 46, and to a frequency-controller circuit 88 which varies the frequency of oscillator 76 during the period when inverter 11 is starting operation.

The trigger circuit 86 may comprise a conventional Schmitt trigger, and will therefore not be described in detail. Such a circuit incorporates first and second NPN transistors 90 and 91 the emitters of which are tied to each other through a lead 92. A plurality of resistors 93–98 are connected in the collector and emitter circuits of transistors 90 and 91, and have impedance relationships known to the art. Such relationships are such that transistor 91 is cut off when transistor 90 is in conduction, and vice versa. As one of numerous places where the Schmitt trigger is illustrated and described, reference is made to the Electronic Equipment Engineering Magazine for December 1963. More specifically, reference is made to FIGURE 2 on page 27 of such magazine, and also to the theoretical discussion starting on page 41 of such magazine.

A resistor 99 is connected from positive control lead 32 to the base of transistor 90, such base also being connected through a switch 101 to negative lead 23. During periods when the main switch or breaker 25 is closed, and switch 101 is open (after a steady-state condition has been achieved), current flows from positive control lead 32 downwardly through resistor 99, thence through the base-emitter junction of transistor 90 and through resistor 97 to the ground lead 23. Thus, transistor 90 is in conduction whereas transistor 91 is cut off. During periods when switch 101 is closed, the base of transistor 90 is shorted to ground, causing such transistor to cut off so that transistor 91 commences to conduct.

As will be described subsequently relative to the inverter-stopping aspects of the invention, means are provided to delay for a predetermined time period the cutting off of transistor 91 subsequent to opening of switch 101. However, in order to simplify the description of the inverter-starting aspects of the invention, the following description (until the next sub-heading) will be written as though no such time-delay means were employed.

The gate circuit 87 includes a PNP transistor 103 the base of which is connected to the junction between two series-related resistors 94 and 96 in the collector circuit of transistor 91. The collector of transistor 103 is connected through the above indicated B+ lead 46 to the upper terminals of resistors 43 and 47 of high-frequency oscillator 41. The collector of transistor 103 is also connected through a lead 104 and diode 106 to the base of a PNP transistor 107 forming part of the frequency controller circuit 88.

The junction between diode 106 and the base of transistor 107 is connected to negative lead 23 through a bias resistor 108. Such resistor maintains transistor 107 in conduction at all times when transistor 103 is in cut-off condition (which occurs, as will be described, when switch 101 is open and switch 25 closed). Three diodes 109–111 and a resistor 112 are connected in series-circuit relationship relative to each other between positive control lead 32 and the emitter of transistor 107, the diodes being oriented to pass current downwardly to such emitter. The junction 113 between the upper two diodes 109 and 110 is connected through a lead 114 to the emitter of transistor 103 in the gate circuit.

The frequency controller circuit 88 further includes a resistor 116 and a relatively high-value capacitor 117, these elements being connected in parallel with each other between the collector of transistor 107 and ground lead 23. Such collector is also connected to the anode of a diode 119, the cathode of such diode being connected through a resistor 120 to the emitter 77 of the uni-junction transistor in oscillator 76.

The transistor 103 in gate circuit 87 is cut off, during periods when switch 101 is open, switch 25 being closed, due to the biasing action of diode 109. During periods when switch 101 is closed, transistor 103 is caused to conduct in response to conduction in transistor 91 of the Schmitt trigger 86. This is because there is then a sufficient flow of current downwardly through resistors 94 and 96 to the conducting transistor 91, and thence through lead 92 and resistor 97 to negative lead 23, to cause the base of transistor 103 to be negative with respect to the emitter thereof, the latter being connected to positive lead 32 through the diode 109. When transistor 103 is thus in conduction (switch 101 being closed), B+ signal is delivered from lead 32 to lead 46 via diode 109, junction 113, lead 114 and transistor 103, so that the high-frequency oscillator 41 commences to oscillate and therefore supplies the described pulse trains to the gates of inverter 11.

As noted above, transistor 107 in the frequency controller circuit 88 commences to conduct immediately upon closing of the main switch or breaker 25, and prior to closing of the switch 101. When switch 101 is closed, so that the Schmitt trigger 86 reverses to cause transistors 91 and 103 to conduct, transistor 107 is simultaneously cut off. Such cutting off is effected because the base of transistor 107 is then more positive than the emitter thereof, there being a bias circuit from junction 113 through lead 114, the conducting transistor 103, lead 104 and diode 106. The voltage drop through such bias circuit is less than through diodes 110 and 111, and resistor 112.

There will next be described the conditions which occur upon closing of the main switch 25 to deliver positive voltage to lead 32, before switch 101 is closed. As described above, transistor 90 is then in conduction, transistor 91 is cut off, transistor 103 is cut off, and transistor 107 is in conduction. Because transistor 103 is cut off, no voltage is delivered through lead 46 to the high-frequency oscillator 41, so that such oscillator is not in operation. The disabling signals transmitted from element 66 to transistors 53 and 54 therefore have no effect. Because transistor 107 is in conduction, current flows from positive lead 32 downwardly through the diodes 109-111, resistor 112 and transistor 107 to the large capacitor 117 to effect charging thereof. As soon as such charging of capacitor 117 progresses sufficiently, current also flows from transistor 107 through diode 119 and resistor 120 to the capacitor 78 in the low-frequency oscillator or modulator 76.

The described current flow through transistor 107 to capacitor 78 is in parallel with current flow through resistors 80 and 79. Such parallel flow of current from lead 32 through transistor 107 and also through resistors 80 and 79 greatly increases the rate of charging of capacitor 78, so that the voltage across such capacitor rises quickly to the value required to fire the unijunction transistor and discharge the capacitor through resistor 82, the frequency of oscillation of oscillator 76 being accordingly increased. The values of resistors 112 and 120 are so selected, relative to the values of resistors 80 and 79 and also relative to the magnitude of capacitor 78, that the frequency of oscillation of oscillator 76 increases greatly, for example to three times its normal free-running frequency. Thus, for example, if the normal frequency of oscillator 76 is approximately 120 cycles per second, as noted above, the frequency of oscillation thereof may be increased to approximately 360 cycles per second.

Upon closing of switch 101, transistor 90 cuts off, transistors 91 and 103 conduct, and transistor 107 cuts off. Transistor 103 being in conduction, positive voltage is supplied through B+ lead 46 to the high-frequency oscillator 41, to initiate operation thereof. Cutting off of transistor 107 breaks the above-described charging circuit through diodes 109-111 and resistor 112 to capacitors 117 and 78, and causes capacitor 117 to commence to discharge. Such discharge is through the resistor 116 and is also through resistor 120 (via diode 119) into capacitor 78. Thus, during the entire period when the large capacitor 117 is discharging, current is supplied to the capacitor 78 through resistor 120 and diode 119, but at a progressively decreasing rate of flow. Such current is, as noted heretofore, in parallel with the current through resistors 80 and 79, so that the frequency of oscillator 76 is maintained elevated (although the frequency progressively decreases). Finally, the charge of capacitor 117 reduces to such a low value that diode 119 becomes back biased, so that all charging current delivered to capacitor 78 passes from lead 32 through resistors 80 and 79. The oscillator 76 then operates at its normal or free-running frequency.

In summary, therefore, the frequency of oscillation of the circuit 76 progressively decreases as capacitor 117 discharges, following which the oscillator 76 continues to operate at its natural or free-running frequency determined by such factors as the magnitudes of resistors 80 and 79. Because voltage was delivered to the high-frequency oscillator 41 simultaneously with cutting off of transistor 107 to initiate discharge of capacitor 117, and because the frequency of modulation of the high-frequency signal is determined (through the amplifier and flip-flop 66, gate modulator transistors 53 and 54, etc.) by the frequency of oscillator 76, it follows that the initial operation of the inverter 11 is at a frequency much higher than its normal frequency.

In the present illustration, wherein the frequency of oscillator 76 is increased to 360 cycles per second, which frequency is halved by the flip-flop portion of circuit 66, the inverter 11 is initially driven at 180 cycles per second. This frequency is very much higher than the resonant frequency of the ferroresonant transformer 27, which has a resonant frequency on the order of 80 or 90 cycles as previously indicated.

The selected initial frequency of operation of the inverter 11 is such that the inductance in the primary 20 of transformer 27 greatly limits the initial surge of current, the output voltage across leads 29 and 30 being only on the order of 10 volts or less. As the frequency of operation of inverter 11 progressively decreases, due to the progressive discharging of the large capacitor 117, the resonant circuit formed by capacitor 28 and by the secondary of transformer 27 becomes operative (in combination with energy stored in the core of the transformer) to limit to a desirable level the current flow through the transformer. Finally, by the time the capacitor 117 has completely discharged, the transformer 27 is operating at its steady-state condition and does not draw an excessive current although it is supplied by the inverter 11 operating at the normal 60-cycle frequency. It is to be noted that such 60-cycle frequency is in the same general range as the resonant frequency of transformer 27.

The magnitude of the resistor 120 in the discharge circuit for capacitor 117 is selected in the following manner. If the magnitude of such resistor 120 is excessively low, the capacitor 117 will discharge continuously and directly through the unijunction transistor and will, therefore, cause the low-frequency oscillator 76 to cease oscillating (the unijunction transistor remaining in conduction). Also, if resistor 116 is too small, the inverter 11 will revert to normal frequency undesirably soon, with resulting high surge currents. On the other hand, if the magnitude of resistor 120 is excessively high, the increase in the starting frequency of oscillator 76 will be undesirably small. Furthermore, the inverter 11 will then continue the above-described high-frequency operation for a much longer period of time than is required to prevent undesirable current surges in the transformer 27. The resistor 116 aids in effecting lowering of the charge on capacitor 117 at the desired rate, so that high-frequency operation is not unduly prolonged.

As an illustration, resistor 120 may have a magnitude of 27 kilohms, whereas the magnitude of resistor 116 may be 1 kilohm, the value of capacitor 117 being 10 microfarads whereas that of caapcitor 78 may be 0.33 microfarad as previously stated. In such a circuit, the entire starting operation may be completed, and the inverter operating at the normal 60-cycle frequency, within twenty or thirty milliseconds after closing of switch 101. The value of resistor 112 may be 120 ohms, which has a bearing upon the rate of charging of capacitors 117 and 78 after switch 101 closes.

In the indicated simple manner, without resort to limiting resistors in the leads 22 or 23, the current flow during the starting operation is maintained at a low value which cannot possibly result in damage to any component of the inverter or associated circuitry.

METHOD AND APPARATUS FOR STOPPING OPERATION OF INVERTER 11 WITHOUT CAUSING ARCING AT THE SWITCH OR CIRCUIT BREAKER 25

The means for stopping operation of inverter 11 includes the previously-described switch 101 which is connected (as schematically represented at 124) with a switch 125 in the output lead 29 between ferroresonant transformer 27 and the line 10 or other load. For example, switches 101 and 125 may form the two poles of a double-pole switch or relay. A third switch 126 may also be connected (as indicated at 124) to switches 101 and 125, being in closed condition when both of switches 101 and 125 are simultaneously open. Such third switch 126 is connected in circuit with capacitor 127 (or other reactive element) being leads 29 and 30, the relationship being such that capacitor 127 is in circuit with the ferrosonant transformer 27 when, and only when, switches 101 and 125 are both open.

The previously-indicated means for delaying operation of the Schmitt trigger 86, following opening of switch 101, forms a part of the circuitry for stopping operation of the inverter. Such means may comprise a capacitor 128 connected between ground lead 23 and the base of transistor 90. The magnitude of capacitor 128 is sufficient to prevent trigger 86 from reversing, subsequent to the simultaneous opening of switches 101 and 125, until after the transformer 27 assumes a steady-state condition. For example, the capacitor 128 may have a magnitude of 20 microfarads.

When it is desired to stop operation of inverter 11, switches 101 and 125 are opened and switch 126 is closed, switch 25 being maintained in closed condition. When switch 101 opens, the capacitor 128 (which was previously shorted) is slowly charged by current flowing through resistor 99 from lead 32. It is not until after capacitor 128 is substantially charged that current from resistor 99 passes through transistor 90 and lead 97, thus causing transistor 90 to conduct and reversing the trigger circuit 86.

Opening of switch 125 breaks the circuit between transformer 27 and the line 10 or other load. When such load circuit breaks, there exists in the transformer 27 a transient condition characterized by wild or erratic oscillations. Such oscillations, however, cease prior to the time that the trigger 86 reverses, which occurs after the time-delay period effected by capacitor 128. Closing of switch 126 increases the reactance of the load on the inverter, for reasons to be discussed hereinafter.

The reversing of circuit 86 cuts off transistor 103 and thus discontinues the supply of B+ voltage through lead 46 to the high-frequency oscillator 41. The supply of gate signal to the SCR's 12 and 13 is accordingly terminated. There being no gate signal to the SCR's, such SCR's shut off despite the fact that the main switch 25 remains closed. Such shutting off of the SCR's, to effect cessation of inverter operation despite the continued closed condition of switch 25, would not normally be possible were it not for the highly reactive nature of the load which is presented by the ferroresonant transformer 27 (particularly when such transformer is associated with the reactive element 127) after switch 125 opens, as will be discussed hereinafter. Since the SCR's have both shut off, there is no flow of current through the lead 22, and switch 25 may therefore be opened without creating any arc.

It is pointed out that opening of switch 101 also operates, after the indicated delay period, to cause transistor 107 to conduct, thereby increasing the frequency of oscillator 76 to the 360-cycle frequency. This, however, has no effect upon the inverter 11 due to the fact that the high-frequency oscillator 41 ceases to operate (and discontinues gate signals to the inverter) prior to the time that the frequency of oscillator 76 increases substantially. The delay period required to prevent the frequency of oscillator 76 from increasing substantially, until after oscillator 41 ceases operation, is effected by such factors as the resistance of resistors 112 and 120, and the magnitude of capacitor 117.

Figure 5:
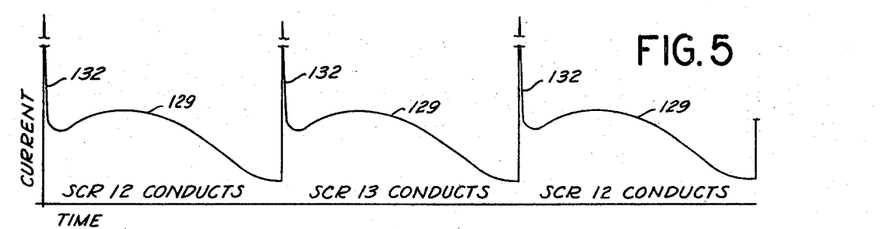
FIGURE 5 is a showing of the current wave form when the output of the inverter is connected to a load which is generally resistive in nature.
Figure 7:
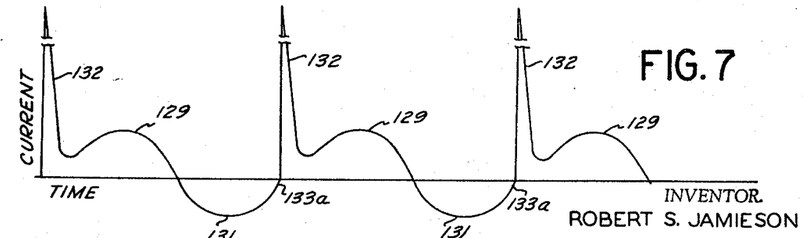
FIGURE 7 is a diagram corresponding to FIGURE 6 but illustrating the condition which occurs when the reactance of the resonant transformer is increased, as by connecting a capacitor across the output terminals thereof.

There will next be described the theory relative to the shutting off of the SCR's 12 and 13, as indicated above. Reference is made to FIGURES 5–7, inclusive, which are idealized illustrations (ignoring ringing and other effects) of the current flow in battery lead 22. In such figures, reference numeral 129 designates SCR current subsequent to commutation, reference numeral 131 designates diode current, and reference numeral 132 designates SCR current spikes which are incident to commutation.

FIGURE 5 shows the wave form of the current through battery lead 22 when switches 25 and 125 are both closed. This is a typical condition, which occurs when the resistive nature of the load (line 10 or other load) on the transformer 27 predominates over the reactive nature of the transformer 27 itself. It is emphasized that there is then no diode current, but instead current flow through alternate SCR's. Thus, as indicated in FIGURE 5, SCR 12 is in conduction during the interval between the first (at the left) two adjacent spikes 132, SCR 13 is in conduction during the interval between the next two adjacent spikes, etc.

It is also pointed out that FIGURES 3 and 4 are correlated to FIGURES 5–7, to indicate the periods when gate signal is supplied to the gates of the SCR's 12 and 13. It is to be noted that, as shown in FIGURE 3, gate signal is supplied to SCR 12 during the time when such SCR is in conduction, namely during the period between adjacent spikes 132. Correspondingly, as shown in FIGURE 4, gate signal is supplied to SCR 13 during the period between the next set of adjacent spikes 132, when such SCR 13 is in conduction.

It is to be understood that, in an SCR inverter 11 or equivalent thereof, each SCR commences to conduct when, and only when, a gate signal is delivered thereto at the proper time in the cycle. When the inverter load is resistive, each SCR shuts off only as the result of reverse current flow therethrough from the other SCR, immediately upon triggering of such other SCR. Thus, the SCR's conduct in alternation, and are "commutated off" in alternation, as shown in FIGURE 5.

If the switch 101 were opened without first opening switch 125, so that line or load 10 remained connected as discussed relative to FIGURE 5, the SCR which is conducting at the instant of termination of gate signal would continue to conduct and would result in disastrous consequences. This would occur because the other SCR would not be triggered and would therefore not be operative to commutate off the SCR which was in conduction at the moment when the gate signal terminated.

Referring next to FIGURE 6, a typical condition (current flow in lead 22) is illustrated wherein switch 125 has been opened, so that the load is disconnected from the secondary of the ferro-resonant transformer 27. The reactive nature of such transformer 27 is therefore no longer dominated by the load or line 10, and becomes operative to effect flow of a substantial reverse or reactive current through the diodes 14 or 15, as shown at 131, during which time conduction through the SCR's ceases. Thus, there is shown at the left in FIGURE 6 a spike 132 and wave portion 129 which indicates flow through SCR 12, and at 131 the diode current flow which immediately follows cessation of current flow in such SCR 12.

Let it be assumed that, when the FIGURE 6 condition exists, the gate signal to the SCR's 12 and 13 is terminated during the period indicated at 129. The SCR in conduction will then continue to conduct until it is extinguished by the next flow of reactive current 131. The next SCR will not be triggered, and the inverter will cease operating. If the gate signal is terminated during a period when reactive current is flowing, as indicated at 131, neither SCR will be re-triggered and the inverter will cease operating.

It is pointed out that the reactive current must flow (the

SCR must be shut off) for a period of time longer than the recovery time of the SCR (normally about 50 microseconds). Thus, it will be understood that the simultaneous termination of the gate signals to both SCR's 12 and 13, caused by cessation of operation of the high-frequency oscillator 41 after switch 101 opens, and assuming that current 131 flows for longer than 50 microseconds, will cause the inverter to cease operating as stated above.

Referring again to FIGURE 6, there is indicated at 133 a short interval when each SCR re-commences to conduct, prior to being cut off by the commutation effect (represented by the adjacent spike 132) which is incident to triggering of the other SCR. Thus, when the FIGURE 6 condition exists, the same SCR (12 or 13) conducts twice during a single half-cycle, as shown at 129 and at 133.

If the gate signal to the SCR's is discontinued at any time except during the period of wave portion 133, the inverter will shut off as desired. Should it occur, however, that the gate signal is terminated at the time when portion 133 exists, the SCR will continue to conduct, it being pointed out that there would then be no commutating action (represented by spike 132) caused by the other SCR since there would be no trigger signal to such other SCR.

Referring next to FIGURE 7, the condition is illustrated where a capacitor 127 or other reactive element (such as an inductor, or a complex reactive network) is employed, being switched into the circuit due to closing of switch 126 as switches 101 and 125 are simultaneously opened. Such reactive element is caused to have a magnitude sufficient to lower the entire curve, by increasing the magnitude of reactive current, until the indicated curve portion 133a is below the axis. Thus, such portion then represents diode current, not SCR current. It follows that, when the FIGURE 7 condition exists, termination of the gate signal at any time whatsoever will result in shutting off of both SCR's.

In summary, therefore, the method for discontinuing operation of the inverter 11, without effecting arcing at switch 25 in the power circuit, comprises insuring that the load is sufficiently reactive in nature that a substantial time period (longer than SCR recovery time) will exist when all current flow is through the diodes 14 or 15 (not through the SCR's 12 or 13), then discontinuing the trigger signals to the SCR's, and subsequently opening the main switch 25. The first of these steps preferably includes disconnecting the load from the reactive element 27, by opening switch 125.

It is to be noted that the voltage in the secondary of transformer 27 is much higher than the inverter output voltage. Thus, there is very much less current flowing through switch 125 than through switch 25, so that opening of switch 125 does not represent a substantial problem. It would be possible, instead of opening switch 125, to switch into the load circuit (just prior to shut off) a large reactive element.

It is emphasized that the transformer 27, which is employed in the present circuit for various purposes including converting the square-wave input to a sinusoidal output, performs the additional important function of permitting the inverter to be shut off in a substantially arc-free manner.

The capacitor 127 (or other reactive element or network) may be omitted if capacitor 28 is sufficiently large, the curve portion 133 (FIGURE 6) then being below the axis as shown at 133a in FIGURE 7. The prevention of the described positive curve portion 133 (FIGURE 6), that is to say the prevention of flow of SCR current at two separate times during a single half-cycle, may also be achieved in various other ways.

BRIEF SUMMARY OF OPERATION

Operation of the circuit is started, without effecting flow of large surge currents through the ferroresonant transformer 27, by first closing the main switch 25 to effect charging of large capacitor 117 and also to effect rapid repeated charging of small capacitor 78 so that the frequency of oscillator 76 is increased greatly. Switch 101 is then closed to effect cutting off of the transistor 107, thereby effecting the following functions simultaneously: (a) application of B+ voltage through lead 46 to the high-frequency oscillator 41, so that trigger signals are for the first time supplied to the gates of SCR's 12 and 13, and (b) initiation of discharge of capacitor 117 through resistor 120 into capacitor 78, whereby the frequency of oscillator 76 progressively reduces to a value effecting the desired steady-state frequency of operation of inverter 11 (for example, 60 cycles per second). Because the inverter 11 is operating at high frequency when trigger signals are first applied to the gates of the SCR's, the inductive reactance of transformer primary 20 is greatly increased, effecting lowering of the starting current to a desired value. The switch 125 closes simultaneously with switch 101, so that the line 10 or other load is immediately connected in the circuit.

The high-freqency gate signals to the SCR gates are modulated, in push-pull relationship, by the low-frequency oscillator 76 and associated amplifier and flip-flop 66, which feeds modulating signals to transistors 53 and 54 emitter-follower transistors 57 and 61, the latter being associated with pulse transformers 38 and 35 connected to the SCR gates. The resulting push-pull pulse trains to the SCR gates are shown in FIGURES 3 and 4.

Operation of the inverter is stopped, without effecting arcing at main switch 25, by first opening switch 101 and the associated switch 125. Disconnecting of the load, caused by opening switch 125, causes the inverter to see only the reactive load formed by the ferroresonant transformer 27 or equivalent reactive element, so that the battery current wave form in lead 22 is changed from the FIGURE 5 condition (for example) to the FIGURE 6 condition. Also, the reactive element 127 may be employed to create a current wave form such as is shown in FIGURE 7. Because the reactive current 131 shown in FIGURES 6 and 7 flows through the diodes 14 and 15 and not through the SCR's 12 and 13, and because the SCR-triggering oscillator 41 ceases to oprate after switch 101 opens, the SCR's do not turn on again. Thus, opening of switch 25 may be effected in the absence of arching. Means (such as capacitor 128) are provided to create a time delay interval subsequent to opening of switches 101 and 125, so that the high frequency gate signal from oscillator 41 will not be discontinued until after a steady-state condition has been achieved in transformer 27.

It is pointed out, relative to FIGURE 6, that the SCR current 129 and 132 predominates over the diode current 131. The difference between these currents represents losses in the circuit.

It is to be understood that in the absence of any external load, transformer 27 appears to the inverter 11 as a capacitive load loosely coupled through an imperfect transformer. Stated otherwise, the equivalent circuit of this transformer would include a rather low shunt indicative reactance across the primary of an ideal transformer, a rather high series leakage inductance between primary and secondary, and a resonant circuit connected across the secondary. Any external load would, obviously, be connected in parallel with the secondary. This discussion necessarily ignores the non-linearities caused when the secondary flux saturates the magnetic path during operation. Reference is made to United States Patents 2,143,745 and 2,694,177.

The operating frequency of the inverter 11 is lower than the resonant frequency of transformer 27, as stated heretofore. Hence, the resonant equivalent circuit would appear to be capacitive in nature. Thus, it might be thought that low starting surge currents would result if the inverter 11 were to start at a very low frequency and then increase, thus avoiding operation at or near resonance. However, in such case the low primary inductance of transformer 27 would permit large currents in the primary windings. By starting at a high frequency, the primary current is reduced. Also, the high series (leakage) inductance of this transformer allows only a small transfer of energy to the secondary at high frequencies, effectively decoupling the resonant circuit (and external load) from the inverter. As the frequency decreases, more energy is passed to the secondary circuit, and the secondary flux rapidly increases. At some point this flux reaches saturation levels and transformer 27 acts to regulate the secondary voltage and to limit the primary current in the normal manner.

It is to be understood that various diodes, for example, may be omitted and/or replaced by other known elements for purposes such as biasing of the transistors, heat compensation, etc. Furthermore, it is to be understood that other circuitry may be employed for many individual circuit portions, such as the Schmitt trigger 86. Also, for example, the unijunction oscillators may be replaced by other relaxation oscillators, the SCR's by thyratrons, etc.

In the appended claims, the entire circuitry (including, for example, elements 76, 66, 53 and 54, 57 and 61, 38 and 35, etc.) may be termed "gate-driver means."

The foregoing detailed description is to be clearly understood as given by way of illustration and example only, the spirit and scope of this invention being limited solely by the appended claims.

I claim:

1. An inverter circuit including means to start, continue and stop inverter operation in the absence of undesirable effects and without the requirement for an expensive transformer in the gate circuitry for the SCR's, which circuit comprises:
   a parallel square-wave SCR inverter incorporating clamping diodes,
      said inverter also incorporating a commutating capacitor and a choke adapted to permit said commutating capacitor to be small in size,
   a coupling transformer the input of which is connected to the output of said inverter,
   switch means in the output circuit of said coupling transformer to connect and disconnect the same relative to a load,
   first and second pulse transformers connected, respectively, to the gates of the SCR's in said inverter,
   first and second transistors connected, respectively, to said pulse transformers,
   a high-frequency oscillator adapted to generate a pulse train having a frequency in the kilocycle range and to supply said pulse train to said first and second transistors, whereby a high-frequency pulse train is transmitted through said pulse transformers to said SCR gates,
   means to supply disabling signals alternately to said first and second transistors to block passage of said high-frequency pulse train therethrough in alternation, thereby effecting supply of a square-wave modulated signal to said SCR gates,
      said last-named means including a low-frequency relaxation oscillator,
   frequency-controller means adapted to increase the frequency of said low-frequency oscillator to a value greatly in excess of the normal free-running frequency thereof,
      said frequency-controller means then operating automatically to reduce the frequency of said low-frequency oscillator to said normal free-running frequency,
   means to effect simultaneous initiation of elevated frequency operation of said low-frequency oscillator and initiation of operation of said high-frequency oscillator whereby said inverter is initially driven at an elevated frequency effecting limiting of flow of current through said coupling transformer, and
   means to stop operation of said inverter,
      said last-named means comprising means to open said switch means between said coupling transformer and said load and thereafter, after a predetermined time-delay interval permitting said coupling transformer to assume a steady-state condition, to discontinue operation of said high-frequency oscillator and thus terminate the gate signals to said SCR's.

2. The invention as claimed in claim 1, in which said circuit includes a Schmitt trigger, a time-delay capacitor connected between the input of said Schmitt trigger and the negative D.C. supply lead, a switch connected in parallel with said capacitor and operably associated with said switch means in said coupling transformer output, a gate transistor connected between said Schmitt trigger and said high-frequency oscillator and also connected between said Schmitt trigger and said frequency-controller means for said low-frequency oscillator, and in which said frequency-controller means includes a transistor which is in cut-off condition when said gate transistor is in conductive condition and vice versa, said frequency-controller means further including a relatively large capacitor operably associated with said low-frequency oscillator to maintain the frequency thereof elevated until said large capacitor has substantially discharged.

3. The invention as claimed in claim 2, in which said high-frequency oscillator and said low-frequency oscillator each comprise unijunction transistor relaxation oscillators.

4. A method of starting and stopping a parallel square-wave SCR inverter incorporating clamping diodes, said inverter being connected through a transformer to a load, which method comprises:
   initially transmitting gate signals to the gates of the SCR's in said inverter at a frequency much higher than the free-running frequency of said inverter whereby to drive said inverter at a greatly elevated frequency and thus limit to a desired value the initial current surge through the primary of said transformer,
   reducing the frequency of said gate signals to drive said inverter at said normal free-running frequency, continuing operation of said inverter for the desired period,
   disconnecting said load from said transformer to thereby cause the reactive nature of said transformer to effect flow of substantial diode current in said inverter, and thereafter discontinuing the gate signals to the SCR's in said inverter to effect cessation of operation thereof.

5. The invention as claimed in claim 4, in which said method further includes providing said gate signals in the form of modulated high-frequency pulse trains, each pulse in each of said trains having a magnitude sufficiently great and a duration sufficiently long to trigger the associated SCR.

6. A circuit for starting and thereafter stopping an inverter without resulting in undesired effects such as arcs and high surge currents, which circuit comprises:
   an SCR inverter,
   transformer means to couple said inverter to a load,
   switch means to disconnect said transformer means from said load,
   a high-frequency oscillator adapted to deliver gate pulse trains in the kilocycle range to the gates of the SCR's in said inverter,
      each pulse in each of said gate pulse trains having a magnitude and duration sufficient to trigger an SCR in said inverter,
   means including a relaxation oscillator adapted when operating at its normal frequency to modulate said gate pulse trains at a frequency effecting operation of said inverter at a desired power frequency, and
   control and time-delay means adapted when said switch means is closed to initiate operation of said relaxation oscillator at a frequency greatly elevated in comparison to said normal frequency,
said control and time-delay means being adapted thereafter to simultaneously energize said high-frequency oscillator and progressively reduce the frequency of said relaxation oscillator to said normal frequency,
said control and time-delay means being adapted thereafter to open said switch means and then, after a predetermined time-delay interval sufficient to permit said transformer to assume a steady-state condition, to stop operation of said high-frequency oscillator and thereafter to increase the frequency of said relaxation oscillator to said elevated frequency.

7. In combination with a battery-inverter circuit which is connected to a resonant load having a predetermined resonant frequency, apparatus for initiating operation of said circuit, said apparatus comprising:
means to initiate operation of said circuit at a frequency greatly in excess of said resonant frequency, whereby at least a substantial initial fraction of the first cycle of operation of said circuit produces in said load a relatively high-frequency surge current much smaller than the surge current which would be produced in said load during an initial fractional cycle of operation at said resonant frequency, and
means to lower the frequency of operation of said circuit to a frequency generally in the same range as said resonant frequency after the impedance of said load has increased to a desired value.

8. Apparatus for initiating operation of an SCR inverter which is connected to an inductive load, said apparatus comprising:
gate-driver means including a relaxation oscillator to drive said inverter at a predetermined free-running frequency,
frequency-controller means to elevate the initial frequency of operation of said relaxation oscillator,
said frequency-controller means including a relatively large capacitor connected in circuit with the relatively small capacitor of said relaxation oscillator,
the relationship between said frequency-controller means and said relaxation oscillator being such that said capacitor in said oscillator may be repeatedly charged by current discharging from said large capacitor and also by current flowing into said oscillator capacitor independently of said large capacitor,
means to effect charging of said large capacitor prior to effecting driving of said inverter by said gate-driver means, and
means to effect concurrent initiation of discharge of said large capacitor and delivery of gate signals to said inverter from said gate-driver means,
whereby the initial frequency of operation of said inverter is elevated to reduce the flow of surge current through said inductive load, following which the frequency of inverter operation decreases in response to the discharge of said large capacitor and as the reactance of said load increases to a value adapted to limit current flow therethrough.

9. The invention as claimed in claim 8, in which resistor means are connected in the circuit between said large capacitor and said oscillator capacitor to control the rate of current flow into said oscillator capacitor from said large capacitor, said resistor means having a value sufficiently great to prevent said relaxation oscillator from ceasing to oscillate, the value of said resistor means also being sufficiently great to maintain the frequency of said relaxation oscillator elevated until the reactance of said load increases to a value sufficient to limit adequately the flow of current therethrough when said inverter is operating at said predetermined free-running frequency, said resistor means having a value sufficiently small to permit a sufficient increase in the initial frequency of said relaxation oscillator to limit to a desired value the initial surge current through said inductive load.

10. The invention as claimed in claim 8, in which said gate-driver means also includes a high-frequency oscillator having a frequency many times said predetermined free-running frequency of said inverter, and further includes means to effect modulation of the signal delivered to the gates of the SCR's of said inverter from said high-frequency oscillator in response to the output of said relaxation oscillator.

11. The invention as claimed in claim 8, in which said relaxation oscillator includes a unijunction transistor the emitter of which is connected through said oscillator capacitor to the negative D.C. lead and is also connected through a frequency-determining resistor to the positive D.C. lead, in which the bases of said unijunction transistor are connected, respectively, to said positive and negative D.C. leads, and in which one side of said large capacitor is connected to said negative D.C. lead and the other side of said large capacitor is connected through an additional resistor to said emitter.

12. An inverter circuit incorporating means to prevent excessive initial current surges, said circuit comprising:
an SCR inverter,
a ferroresonant transformer having the input thereof connected to the output of said inverter,
a storage battery connected to the input of said inverter,
means to drive the gates of the SCR's in said inverter at a predetermined free-running frequency, and
means associated with said last-named means to increase the initial frequency of operation of said inverter sufficiently to limit to a desired value the flow of surge current through said transformer, and thereafter operative to reduce the frequency of inverter operation to said free-running frequency.

13. A method of providing in steady-state operating condition at a predetermined frequency the combination of an SCR inverter circuit and a resonant load, which method comprises:
providing an SCR inverter,
connecting the output of said inverter to a resonant load comprising a harmonic-suppressing ferroresonant transformer having a resonant frequency which is substantially higher than said predetermined frequency,
initially supplying gate signals to the SCR's in said inverter at a frequency greatly in excess of said resonant frequency whereby to drive said inverter at a frequency greatly in excess of said resonant frequency and thereby reduce the initial current surge through said load,
continuing to drive said inverter at an elevated frequency in excess of said resonant frequency until the reactance of said load has increased to a desired value, and
thereafter reducing the frequency of said gate signals until said inverter is operating at said predetermined frequency.

14. An SCR circuit, which comprises:
an SCR adapted to be triggered by a pulse having at least a predetermined magnitude and at least a predetermined duration,
means to deliver to the gate of said SCR a pulse train having a frequency in the kilocycle range,
said last-named means being so constructed that each pulse in said pulse train has a magnitude and duration at least as great as the magnitude and duration of the pulses required to trigger said SCR, and
means to pass through the anode and cathode of said SCR a current having a frequency in the power range.

15. An inverter circuit, which comprises:
a parallel square-wave SCR inverter incorporating clamping diodes,
said inverter also incorporating a commutating capacitor and a choke adapted to permit said commutating capacitor to be relatively small in size,
a first pulse transformer the secondary of which is connected between the gate and cathode of one of the SCR's in said inverter,
a second pulse transformer the secondary of which is connected between the gate and cathode of the other SCR in said inverter,
a first transistor connected to control the passage of signal to the primary of said first pulse transformer,
a second transistor connected to control the passage of signal to the primary of said second pulse transformer,
a high-frequency oscillator connected to said first and second transistors to effect delivery of high-frequency pulse trains to said first and second pulse transformers, and
modulator means connected to said first and second transistors to modulate said high-frequency pulse trains at a frequency adapted to effect driving of said SCR's to effect operation of said inverter at the desired rate.

16. The invention as claimed in claim 15, in which said modulator means comprises a flip-flop driven by a low-frequency oscillator, said flip-flop being adapted to cut off said first transistor and said second transistor in alternation.

17. The invention as claimed in claim 16, in which means are provided to increase greatly the frequency of said low-frequency oscillator while delaying initiation of operation of said high-frequency oscillator, said means being adapted to effect simultaneous initiation of operation of said high-frequency oscillator and initiation of a progressive decrease in the frequency of said low-frequency oscillator, whereby said inverter is initially operated at a substantially elevated frequency and is then operated at the normal free-running frequency thereof.

18. The invention as claimed in claim 15, in which said high-frequency oscillator is a unijunction transistor relaxation oscillator adapted to generate a pulse train having a frequency in the kilocycle range, each pulse in said pulse train having a duration sufficient to trigger an associated SCR gate.

19. In combination with an SCR circuit wherein it is conventional to trigger the gate of the SCR by means of a voltage pulse having a predetermined shape, a means for triggering said SCR gate, said means comprising:
means to generate and deliver to said SCR gate a high-frequency pulse train,
said means being such that each pulse in said pulse train has a magnitude sufficiently great and a duration sufficiently long to effect triggering of said SCR, and
means to modulate said pulse train in such manner that the envelope thereof corresponds generally to the shape of the pulse conventionally employed to trigger said SCR gate.

20. The invention as claimed in claim 19, in which said pulse train has a frequency in the kilocycle range.

21. The invention as claimed in claim 19, in which the frequency of said pulse train is between 15 kilocycles and 30 kilocycles.

22. An inverter circuit, which comprises:
a parallel square-wave SCR inverter incorporating clamping diodes and adapted to deliver current to a reactive load at a predetermined free-running frequency, and
means to drive the gates of said inverter to operate the same at said free-running frequency,
said means comprising a high-frequency oscillator adapted to supply to said gates a high-frequency signal having a frequency many times said free-running frequency, and
means to modulate the signal delivered to said gates from said oscillator at said free-running frequency and in a manner effecting operation of said inverter at said free-running frequency.

23. The invention as claimed in claim 22, in which said modulation means is adapted to cause the gate-driving signal to the SCR's in said inverter to be modulated in the manner of a square wave having a frequency equal to said predetermined free-running frequency.

24. The invention as claimed in claim 23, in which said modulation means is so constructed and operated that the duration of each pulse train delivered to each of said SCR's during one half-cycle of inverter operation is substantially equal to the time required by such one half-cycle of inverter operation.

25. The invention as claimed in claim 22, in which said circuit includes means to cause said frequency of said pulse train to be in the kilocycle range when the frequency of the current passing through the anodes and cathodes of the SCR's is in the conventional power range.

26. A method of driving an SCR which is connected to a reactive load, said method comprising:
supplying to the gate of said SCR a train of trigger signals each having a magnitude and duration sufficient to trigger said SCR, and
causing the frequency of said train of signals to be many times the frequency of the current passed through said SCR to said load whereby a trigger signal will be present at said gate when it is desirable that said SCR be triggered.

27. The invention as claimed in claim 26, in which said method further comprises modulating said train of trigger signals.

28. The invention as claimed in claim 27, in which said method comprises effecting said modulation at said frequency of the current passing through said SCR to said load and in the manner of a square wave.

29. A method of triggering the gate of an SCR through the anode and cathode of which is passing a current having a predetermined frequency, which method comprises:
supplying to the gate of said SCR a train of pulses each of which has a magnitude and a duration sufficient to trigger said SCR, and
causing the frequency of said train of pulses to be in the kilocycle range and many times said predetermined frequency.

30. A method of triggering the gates of the SCR's in a parallel square wave SCR inverter incorporating clamping diodes, said inverter being connected to a reactive load, which method comprises:
generating and delivering to the gates of the SCR's in said inverter trains of positive pulses each having a magnitude and a duration sufficient to trigger the associated gate,
the frequency of said trains being in the kilocycle range, and
modulating said trains of pulses in such manner that a pulse train portion is supplied first to the gate of one of said SCR's and then to the gate of the other of said SCR's to effect operation of said inverter at the modulation frequency,
said modulation frequency being in the power range.

31. In combination with a battery-SCR inverter circuit, means to effect stopping of inverter operation in the absence of substantial arcing or other undesired effects, said means comprising:
means to cause the load on said inverter to be sufficiently reactive to cause cessation of current flow through each of the SCR's in said inverter for a time period longer than the recovery time of such SCR, and means operable subsequently to operation of said last-named means to discontinue the gate signals to said SCR's.

32. In combination with a parallel square-wave SCR-diode inverter which is connected through a transformer to a load, said transformer being sufficiently reactive to result in flow of substantial diode current in said inverter during periods when said load is disconnected from said transformer, means to stop operation of said inverter in the absence of substantial arcing and other undesired effects, said means comprising:

switch means to disconnect said load from said transformer, and means operable subsequently to operation of said switch means to discontinue the gate signals to the SCR's in said inverter.

33. The invention as claimed in claim 32, in which a reactive element is provided across the output of said transformer, and in which means are provided to connect said reactive element across said output concurrently with disconnection of said load from said transformer, whereby to increase the reactance of said transformer and thereby effect flow of diode current for a relatively long period of time.

34. In combination with a parallel square-wave SCR inverter which is connected through a reactive coupling element to a load, said coupling element being sufficiently reactive to result in flow of substantial diode current in the SCR's in said inverter during periods when said load is disconnected from said coupling element, means to stop operation of said inverter in the absence of substantial arcing and other undesired effects, said means comprising:

a first switch element adapted to disconnect said load from said reactive coupling element, a second switch element adapted to effect cessation of gate signals to the SCR's in said inverter, and time-delay means operably associated with said first and second switch elements to delay discontinuance of the gate signals to said inverter SCR's subsequent to opening of said first switch element for a time period sufficient to permit said reactive coupling element to assume a steady-state condition.

35. The invention as claimed in claim 34, in which said reactive coupling element is a harmonic-suppressing ferroresonant transformer.

36. In combination with a parallel square-wave SCR-diode inverter connected through a reactive coupling element to a load, apparatus for stopping operation of said inverter in the absence of undesirable arcing and other effects, which apparatus comprises:

means responsive to disconnection of said load from said reactive coupling element to effect during each half-cycle of inverter operation only a single operation of one of the SCR's in said inverter followed by operation of one of the diodes in said inverter through a period longer than the recovery time of said SCR, said means being such that said single operation of said SCR during each half-cycle occurs immediately subsequent to triggering of such SCR, and said single operation of said diode occurs immediately prior to triggering of the other SCR in said inverter, and means to discontinue the gate signals to said SCR's in said inverter subsequent to disconnection of said load from said reactive coupling element.

37. An inverter circuit, which comprises:

a parallel square-wave SCR inverter incorporating clamping diodes, a ferroresonant transformer the input of which is connected to the output of said inverter, the output of said transformer having a first switch therein adapted to connect said transformer output to a load, means to supply gate signals alternately to the SCR's in said inverter throughout at least a major portion of each half-cycle of inverter operation whereby to permit re-triggering of each SCR as required by the reactive nature of the load, trigger means adapted when in one stable condition to effect termination of said trigger signals to said SCR gates, a second switch adapted when operated to effect reversing of said trigger means to said one stable condition, means to operably associate said first and second switches to effect simultaneous operation thereof, and means to delay reversing of said trigger means to said one stable condition for a time period at least sufficient to permit said transformer to assume a steady-state condition subsequent to opening of said first switch.

38. The invention as claimed in claim 37, in which said time delay means includes a capacitor connected in parallel with said second switch between the negative D.C. lead and the input of said trigger mens.

39. A method of stopping operation of a parallel SCR inverter incorporating clamping diodes, which comprises:

causing the load on said inverter to be sufficiently reactive to effect cessation of current flow through each of the two SCRs incorporated in said inverter during a substantial portion of the half-cycle of inverter operation during which such SCR would continuously conduct if the load on said inverter were resistive, said substantial portion being at least as long as the recovery time of such SCR, and thereafter discontinuing the supply of gate signals to said SCR's.

40. A method of discontinuing operation of a parallel square-wave SCR-diode inverter which is connected through a ferroresonant transformer to a load, which method comprises:

disconnecting said load from said transformer, whereby the reactive nature of said transformer effects flow of substantial reactive current in the diodes in said inverter, delaying for a time period sufficient to permit said transformer to assume a steady-state condition subsequent to disconnection of said load therefrom, and thereafter discontinuing the gate signals to the SCR's in said inverter.

41. A method of operating a controlled rectifier, which comprises:

connecting the anode and cathode of a controlled rectifier into an electrical circuit, determining the desired frequency of the main current wave in said circuit through said anode and cathode, supplying at least one burst of triggering pulses to the gate of said controlled rectifier each time it is desired that said anode and cathode conduct said main current wave therethrough to thereby establish said desired frequency of said main current wave, causing each of said triggering pulses to have a voltage sufficiently high and a duration sufficiently long to effect firing of said controlled rectifier, and causing the frequency of said triggering pulses in each of said bursts to be many times said frequency of said main current wave, whereby said bursts of triggering pulses are characterized by good resolution, and said main current wave by minimum distortion.

42. The invention as claimed in claim 41, in which the frequency of said triggering pulses in each of said bursts is in the kilocycle range, and the frequency of said main current wave is in the power range.

43. The invention as claimed in claim 41, in which the frequency of said triggering pulses in each of said bursts is many kilocycles, and the frequency of said main current wave is in the power range.

44. The invention as claimed in claim 41, in which said method further comprises connecting a direct current source into said electrical circuit.

45. The invention as claimed in claim 44, in which said method additionally comprises connecting into said electrical circuit a reactive load.

46. The invention as claimed in claim 45, in which said reactive load has an unknown or varying power factor.

47. The invention as claimed in claim 41, in which said method further comprises causing each of said triggering pulses to have a very short rise time.

48. The invention as claimed in claim 41, in which the triggering pulses in each of said bursts are in substantially equally-spaced relationship relative to each other.

49. A method of operating a controlled rectifier, which comprises:
  connecting the anode and cathode of a controlled rectifier into an electrical circuit with a power source and a load,
  supplying bursts of triggering pulses to the gate of said controlled rectifier at a burst-repetition rate at least equal to the desired frequency of the main current wave through said anode and cathode,
  causing each of said triggering pulses to have a voltage sufficiently high and a duration sufficiently long to effect firing of said controlled rectifier, and
  causing the ratio of the frequency of the triggering pulses in each of said bursts, relative to said burst-repitition rate, to be very high,
    whereby said bursts of triggering pulses are characterized by good resolution, and said main current wave by minimum distortion.

50. The invention as claimed in claim 49, in which said load is reactive and has an unknown or varying power factor.

51. A method of operating a controlled rectifier, which comprises:
  connecting the anode and cathode of a controlled rectifier into an electrical circuit with a power source and a load,
  determining the desired conduction periods of said controlled rectifier,
  supplying to the gate of the controlled rectifier a burst of triggering pulses each time it is desired to initiate conduction in said controlled rectifier,
  causing each of said triggering pulses to have a voltage sufficiently high and a duration sufficiently long to effect firing of said controlled rectifier, and
  causing the frequency of the triggering pulses in each of said bursts to be sufficiently high, relative to the frequency of said conduction periods, that a multiplicity of said triggering pulses are supplied to said gate for each of said conduction periods,
    whereby said bursts of triggering pulses are characterized by good resolution, and said main current wave by minimum distortion.

52. The invention as claimed in claim 51, in which said load is reactive and has an unknown or varying power factor.

53. A method of driving the gates of the SCR's in an inverter, which comprises:
  connecting first and second relatively small pulse transformers, respectively, to the gates of first and second SCR's in an SCR inverter,
  supplying bursts of triggering pulses alternately to said first and second pulse transformers and at a burst-repetition rate dependent upon the desired frequency of operation of said inverter,
  causing the voltage and duration of each triggering pulse in each of said bursts to be sufficiently high to fire the associated SCR, and
  causing the frequency of the triggering pulses in each of said bursts to be many times said desired frequency of operation of said inverter.

54. The invention as claimed in claim 53, in which said method further comprises providing said inverter in the form of a parallel SCR square-wave inverter incorporating clamping diodes, a commutating capacitor and an inductor, the inductor being connected in such manner that the size of said commutating capacitor may be relatively small, and in which said method additionally comprises connecting said inverter to a reactive load.

55. A controlled rectifier circuit, which comprises:
  at least one controlled rectifier having an anode, a cathode and a gate,
  circuit means connecting said anode and cathode in circuit with a source of power and a load, and
  triggering means to supply to said gate a series of bursts of triggering pulses at a burst-repetition rate at least equal to the desired frequency of conduction of said controlled rectifier when supplying power from said power source to said load,
    said triggering means supplying triggering pulses each having a voltage sufficiently high and a duration sufficiently long to effect firing of said controlled rectifier,
    said triggering means supplying triggering pulses in each of said bursts at a frequency many times said desired frequency of conduction of said controlled rectifier, whereby said bursts of triggering pulses are characterized by good resolution, and the main current wave through said anode and cathode by minimum distortion.

56. The invention as claimed in claim 55, in which said triggering means supplies triggering pulses in the kilocycle range, and in which said burst-repetition rate is such that the frequency of the main current wave through said anode and cathode is in the power range.

57. The invention as claimed in claim 56, in which said triggering means is such that the frequency of said triggering pulses in each of said bursts is many kilocycles.

58. The invention as claimed in claim 55, in which said triggering means is such that each of said triggering pulses has a very short rise time, and is also such that said triggering pulses in each of said bursts are supplied in substantially equally-spaced relationship relative to each other.

59. An SCR circuit, which comprises:
  an SCR having an anode, a cathode and a gate,
  circuit means to connect said anode and cathode of said SCR in circuit with a direct current source and a reactive load, and
  triggering means to supply bursts of triggering pulses to said gate at a burst-repetition rate at least equal to the desired frequency of the main current wave through said anode and cathode,
    said triggering means being such that each of said triggering pulses has a voltage sufficiently high and a duration sufficiently long to effect firing of said SCR,
    said triggering means also being such that the ratio of the frequency of the triggering pulses in each of said bursts, relative to said burst-repetition rate, is very high, whereby said bursts of triggering pulses are characterized by good resolution, and said main current wave is characterized by minimum distortion.

60. A controlled rectifier circuit, which comprises:
  a controlled rectifier having an anode, a cathode, and a gate,
  circuit means to connect said anode and cathode in circuit with a power source and a load, and
  triggering means to supply to said gate a burst of triggering pulses each time it is desired to initiate conduction in said controlled rectifier,
    said triggering means being such that each of said triggering pulses has a voltage sufficiently high and a duration sufficiently long to effect firing of said controlled rectifier, said triggering means also being such that the frequency of said triggering pulses in each of said bursts is sufficiently high, relative to the repetition rate of said bursts, that a multiplicity of said triggering pulses are supplied to said gate for each occurrence of conduction in said controlled rectifier, whereby said bursts of triggering pulses are characterized by good resolution, and the main current wave through said anode and cathode by minimum distortion.

61. An inverter system, which comprises:

a parallel square-wave SCR inverter incorporating first and second SCR's and also incorporating clamping diodes, a commutating capacitor and an inductor, first and second relatively small pulse transformers, circuit means to connect said inverter in circuit with a source of direct current and a reactive load whereby to effect supply of alternating power from said current source to said load, circuit means to connect said first and second pulse transformers, respectively, to the gates of said SCR's in said inverter, and triggering means to supply bursts of triggering pulses alternately to said first and second pulse transformers and at a burst-repetition rate dependent upon the desired frequency of operation of said inverter, said triggering means supplying pulses to said pulse transformer in such manner that each pulse has a voltage sufficiently high and a duration sufficiently long to effect triggering of the associated SCR, said triggering means supplying said pulses in each of said bursts at a frequency many times said desired frequency of operation of said inverter.

References Cited

UNITED STATES PATENTS

| | | | |
|---|---|---|---|
| 2,124,740 | 3/1964 | Corey et al. | 321—45 |
| 3,229,111 | 1/1966 | Schumacher et al. | 307—64 |
| 3,259,827 | 7/1966 | Stromeier et al. | 321—4 |
| 3,264,548 | 8/1966 | King | 321—45 |

LEE T. HIX, *Primary Examiner.*

W. M. SHOOP, *Assistant Examiner.*